United States Patent [19]
Shipman et al.

[11] 3,712,640
[45] Jan. 23, 1973

[54] MOTORCYCLE KICKSTAND

[76] Inventors: David E. Shipman, 6160 Grove Avenue; Robert C. Bunker, 3717 Longdale, both of Flint, Mich. 48505; William Bunker, 6649 Branch Road, Flint, Mich. 48506

[22] Filed: June 9, 1971

[21] Appl. No.: 151,297

[52] U.S. Cl. ................................. 280/301, 280/304
[51] Int. Cl. .............................................. B62h 1/02
[58] Field of Search .................. 280/298–300, 301, 280/304

[56] References Cited

UNITED STATES PATENTS

| 523,952 | 7/1894 | Woodward | 280/301 |
|---|---|---|---|
| 602,134 | 4/1898 | Hawkes | 280/298 X |
| 948,349 | 2/1910 | Settle | 280/298 |
| 1,143,780 | 6/1915 | Pinto | 280/298 |
| 2,074,422 | 3/1937 | Pawsat | 280/301 |
| 2,308,794 | 10/1943 | Thompson | 280/301 |

FOREIGN PATENTS OR APPLICATIONS

| 11,425 | 1902 | Great Britain | 280/304 |
|---|---|---|---|
| 582,601 | 11/1946 | Great Britain | 280/301 |
| 69,205 | 6/1915 | Austria | 280/298 |
| 97,193 | 12/1922 | Switzerland | 280/298 |

Primary Examiner—Leo Friaglia
Attorney—Hauke, Gifford & Patalidis

[57] ABSTRACT

A kickstand for attachment to a frame of a motorcycle or the like and of the type adapted to swing selectively into a first position along the side of the motorcycle and to a second position extending downwardly from one side of the frame to contact the ground so as to support the motorcycle frame in an upright position. The kickstand includes a tubular member having one end releasably clamped to the motorcycle frame, while the other end telescopically engages a support rod which is positionally adjustable along the length of the tubular member such that the overall kickstand length may be longitudinally adjusted for use with motorcycles of varying sizes. The kickstand includes a novel theft prevention clamping device.

8 Claims, 5 Drawing Figures

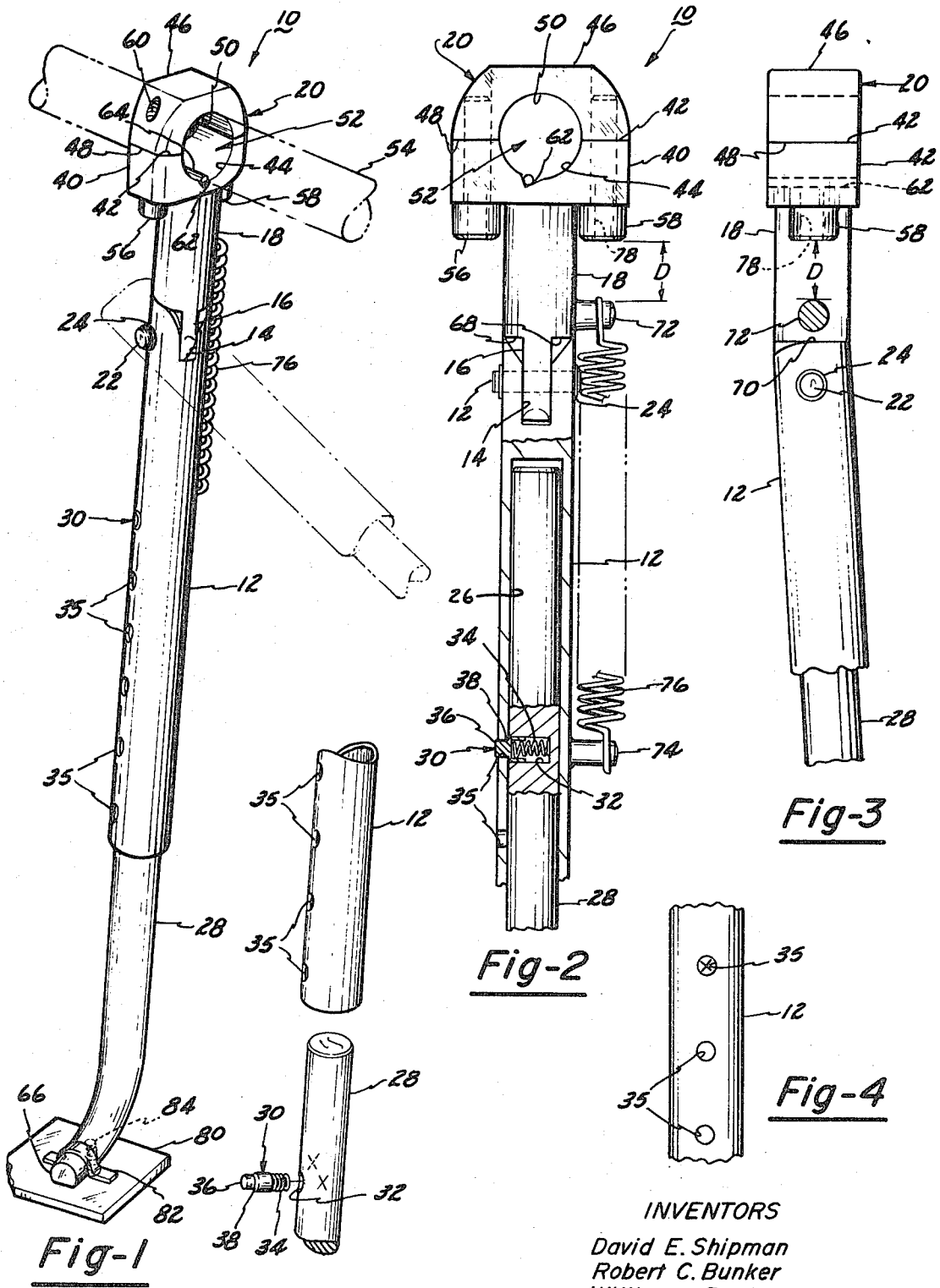

3,712,640

MOTORCYCLE KICKSTAND

BACKGROUND OF THE INVENTION

1. Field of the Invention

The present invention relates to an improvement in kickstands for two wheeled vehicles such as motorcycles and the like and, more specifically, the invention relates to a new and improved adjustable kickstand for motorcycles.

2. Description of the Prior Art

Heretofore, two wheeled vehicles, such as motorcycles and the like, have been provided with supports or kickstands which have consisted of a stiff rod pivotably mounted to the frame of the vehicle, which rod is adapted to be moved into position by swinging the same laterally outwardly and downwardly with the foot. The conventional type rod is always of the same length and thus it is difficult or impossible to adjust it properly to the unevenness of the ground on which the vehicle is placed and parked. It has been suggested that a kickstand be provided which is longitudinally adjustable and which can be adjusted so that the vehicle may be properly placed in an inclined position so that it will not fall upon the ground but will be held safely in its parked position. Of the longitudinally adjustable kickstands which have heretofore been proposed, none can be attached to the frame of the vehicle in a manner which prevents the same from rotating relative to the frame when the vehicle has been inclined in a parking position, while at the same time providing a simple longitudinally adjustable kickstand which can be quickly and easily readjusted to a length adapted for the particular size of the vehicle on which it is installed, and which kickstand will provide the necessary support for heavy vehicles such as motorcycles.

The particular kickstand disclosed in the present invention is particularly adapted for use on custom motorcycles which necessitate a kickstand that is not only functionally acceptable but which must also be manufactured in an aesthetically pleasing manner to enhance the overall appearance of the custom made motorcycle. Since a custom made kickstand having all of the aforementioned advantages is relatively expensive to manufacture as compared to a conventional kickstand, it would be desirable to provide means for preventing the theft of such kickstand, but which theft prevention means are extremely simple and do not detract from the appearance of the kickstand or the motorcycle.

SUMMARY OF THE INVENTION

The present invention, which will be subsequently described in greater detail hereinafter, comprises a longitudinally adjustable kickstand adapted to be attached to a two wheel vehicle and of the type which may be swung selectively from a first position alongside the vehicle to a second position extending downwardly and outwardly from the vehicle to support the same in an upright position. Means for preventing the theft of the support are provided.

It is therefore an object of the present invention to provide a new and improved kickstand adapted to support a two wheel vehicle in a parked position.

It is a further object of the present invention to provide novel and improved means for preventing the theft of the kickstand.

Further objects, advantages and applications of the present invention will become apparent to those skilled in the art of supports for two wheeled vehicles when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 1 is a perspective view of a kickstand constructed in accordance with the principles of the present invention;

FIG. 2 is a fragmentary partially cross-sectioned side elevational view of the kickstand illustrated in FIG. 1;

FIG. 3 is a fragmentary, rear elevational view of the kickstand illustrated in FIG. 1 with the return spring removed for clarity;

FIG. 4 is a fragmentary view of the kickstand illustrated in FIG. 1; and

FIG. 5 is a fragmentary, exploded perspective view of FIG. 4.

DESCRIPTION OF THE PREFERRED EMBODIMENT

Referring to the drawings and in particular to FIGS. 1 and 2, there is illustrated a kickstand 10 particularly adapted to support a two wheeled vehicle, such as a motorcycle, in an upright position so that the same cannot fall to the ground but will be held safely in a parked position. The kickstand 10 comprises a tubular member 12, having a slot 14 formed at its upper end and within which is received a flange 16 of a cylindrical stem portion 18 which, in turn, forms the lower half of a clamping device 20. The flange 16 is pivotably connected to the upper end of the tubular member 12 by means of a pin 22 extending through both the tubular member 12 and flange 16 and secured at its opposite ends by any suitable means, such as retainer clips 24.

As can best be seen in FIG. 2, an internal bore 26 of the tubular member 12 opens at the lower end thereof and telescopically receives a support rod 28. Rod 28 is movable longitudinally within the bore 26 and adapted to be restrained against longitudinal movement at selected positions along the length of the tubular member, whereby the overall length of the kickstand 10 may be adjusted for use with vehicles of varying sizes. Positioning of the rod 28 with respect to the tubular member 12 is accomplished by means of a detent 30 which is slidably disposed in a transverse bore 32 within the rod 28 and biased outwardly by a compression coil spring 34. The tubular member 12 has a plurality of longitudinally spaced and radially disposed apertures 35, which are adapted to receive the outer end 36 of the detent 30 when the same becomes aligned with any one of the apertures 35 as illustrated in FIG. 2. The detent 30 has a shoulder 38, the outer diameter of which is slightly larger than the aperture 35, such that abutment of the shoulder 38 against the inner surface of the tubular member bore 26 restrains further radial outward movement of the detent 30 under the biasing force of the spring 34. When it is desired to change the longitudinal length of the kickstand 10, the operator simply depresses the detent 30 inwardly into the support rod bore 34 with a suitable instrument, such as a screwdriver, until the end 36 clears the aperture 35, whereupon the rod 28 is free for both rotational and axial movement within the tubular member bore 26.

In the preferred embodiment, the rod 28 is marked on opposite sides of the detent 30, as can best be seen in FIGS. 4 and 5, with an X at positions angularly spaced from the detent 30, such that when the rod 28 is rotated, either leftwardly or rightwardly, about its longitudinal axis within the bore 26 after disengagement of the detent 30 from the aperture 35, an X will come into view of the user through the aperture 35. Once the X is in view, as clearly illustrated in FIG. 4, the user may longitudinally move the rod 28 upwardly or downwardly within the bore 26 with the X coming into view as it passes under each aperture 35 such that the user will be aware of the exact location of the detent 30, whereby he may easily readjust the length of the kickstand simply by rotating the rod 28 until the detent 30 engages the aperture 35 associated with the appropriate length required to accommodate the particular vehicle on which the kickstand is attached.

The clamping device 20 comprises an enlarged flange 40 formed at the upper end of the stem portion 18, having upper flat surfaces 42 and an intermediate circular slot 44. An upper U-shaped clamping member 46, having flat surfaces 48 and an intermediate circular slot 50, is adapted to be attached to the flange 40 such that the flat surfaces 42 and 48 mate and the intermediate slots 44 and 50 form a circular bore 52 within which is disposed the tubular portion 54 of the frame of a two wheeled vehicle such as a motorcycle. The clamping member 46 is tightly secured to the flange 40 and thus the kickstand 10 to the tubular portion 54 of the vehicle frame by means of conventional Allen bolts 56 and 58 which extend upwardly through bores in the flange 40 and into threaded bores 60 in the upper clamping member 46.

As can best be seen in FIGS. 1 and 2, the circular slot 44 has a transverse notch 62 accommodating a cylindrically shaped pin 64, which projects slightly above the circular contour of the slot 44 such that, when the clamping member 46 and the flange 40 are secured to one another by the Allen bolts 56 and 58, the pin 64 is wedged tightly between the notch 62 and the outer periphery of the tubular portion 54 of the vehicle frame. It can be seen that when the weight of the vehicle is brought against the kickstand 10, that is, when the vehicle is inclined slightly in a conventional manner, there will be a tendency for the kickstand 10 to rotate in a clockwise direction around the frame (as viewed in FIG. 2). Such rotational movement is prevented by the wedging engagement of the pin 64 between the notch 62 and the tubular portion 54 of the vehicle frame. In the event there should be a tendency for the kickstand to rotate in the opposite direction, that is, in a counterclockwise direction as viewed in FIG. 2, the same wedging action will occur between the pin 62 and the peripheral surface of the vehicle frame portion 54, and thus a very necessary, but simple and inexpensive means is provided for preventing relative rotation between the clamping device 20 and the vehicle frame as the kickstand 10 is adapted to carry a substantial weight when used to support motorcycles.

The kickstand tubular member 12 is adapted for pivotal movement with respect to the stem portion 18 to a position wherein it is normally maintained in a generally horizontal plane alongside that of the vehicle frame, as shown in phantom lines in FIG. 1; and when the vehicle is desired to be parked, the kickstand tubular member 12 is pivoted downwardly such that the lower curved end 66 of the rod 28 will extend outwardly from the vehicle to contact the ground to support the vehicle in a generally upright parked position. As can best be seen in the rear view of the kickstand 10 illustrated in FIGS. 2 and 3, the lower portion of the stem 18 forms shoulders 68 on opposite sides of the lower flange 16 which are brought into abutment with the upper end 70 of the tubular member 12 when the kickstand 10 is pivoted to its downward position to limit further rotational movement of the tubular member 12, while permitting the kickstand 10 to rotate slightly beyond a vertical position, say 3°, such that the weight of the vehicle when imparted to the kickstand 10 tends to rotate the tubular member 12 in a direction which maintains the upper end 70 of the tubular member 12 in abutment with the shoulders 68 of the stem portion 18, that is, the weight of the vehicle tends to maintain the kickstand in a down position, and thus a simple safety feature preventing the collapse of the kickstand 10 is provided.

As can best be seen in FIGS. 2 and 3, the lower rear portion of the stem 18 has a pin 72 secured thereto by any suitable means, such as by welding, while the tubular member 12 has a similar pin 74 attached to the peripheral surface thereof. A coil spring 76, having one end attached to the upper pin 72 and the other end attached to the lower pin 74, is normally brought into tension when the kickstand 10 is lowered from its raised position to its ground supporting position such that the spring 76 exerts a biasing force on the kickstand 10 to return and maintain the same in its raised position such that the kickstand 10 will not drop from the raised position when the vehicle is being driven. It should be noted that when the kickstand 10 is brought to the ground position, that is, a position slightly rotated beyond the vertical as hereinbefore explained, the spring 76, in addition to the weight of the vehicle, tends to maintain the kickstand 10 in its ground engaging position as the resultant forces acting on the tubular member 12 tend to rotate the tubular member 12 counterclockwise beyond the vertical position as illustrated in FIG. 3.

The Allen bolts 56 and 58 each have a slot 78 adapted to receive a conventional Allen key of a mating configuration so that the bolts may be rotated within their respective threaded bores 60 to disassemble the clamping device 20 from the vehicle frame.

Of particular importance is the spacing D (FIGS. 2 and 3) between the head of the Allen bolt 56 and the transversely disposed spring support pin 72 carried by the stem 18. The spacing D between these two elements is such that a conventional Allen key cannot be inserted into the Allen key slot 78 as the spring support pin 72 will interfere with a proper alignment between the Allen key and the Allen key slot 78. Thus, a special shortened Allen key is required in order to disassemble the clamping device 20 from the frame of the vehicle.

As indicated hereinbefore, the present invention is particularly adapted to be incorporated into kickstands that may be interchangeably used on custom made motorcycles, and thereby necessitating a rather attractive kickstand, such as a chrome plated kickstand. Since the kickstand is not a low cost item, placement of the spring support pin 72 beneath the head of the Allen bolt 58 and the requirement of a special Allen key to remove the kickstand 10 from the vehicle frame results in an extremely simple but very effective theft prevention device.

As can best be seen in FIG. 1, the end 66 of the rod 28 is curved slightly for engagement with the ground. A rectangular support plate 80, the use of which is optional, is adapted to be attached to the bottom surface of the curved end 66 by any conventional fastening means, such as a strap 82 welded to the upper face of the plate 80 and through which the curved end 66 is insertable, and fastening means such as screws 84 which extend through the plate 80 and into threaded bores of the rear side of the support rod 28. The plate 80 is particularly useful when it is contemplated that the vehicle may have to be supported on soft ground, wherein the curved end 66 of the support rod 28 may sink into the ground under the weight of the vehicle, whereas with the plate 80 the weight of the vehicle is distributed over a larger area and thus safer support is provided for the vehicle.

It can be seen from the foregoing description that the invention consists of certain novel details of construction and a combination of parts which result in a kickstand that is simple in its construction and use, but which is also durable, sturdy and well adapted for rough usage to which said kickstand may ordinarily be subjected to and which has numerous built-in structural safety and theft prevention features.

Although only one form of the present invention has been described, it should be apparent to those skilled in the art of two wheeled vehicle supports that modification can be made without departing from the spirit of the invention or the scope of the appended claims.

What is claimed is as follows:

1. A kickstand adapted to be releasably attached to the frame of a two wheeled vehicle, said kickstand being of the type adapted to swing selectively into a first position alongside of said vehicle frame and a second position extending downwardly and laterally outwardly from one side of said frame to contact the ground so as to support the vehicle in an upright position, said kickstand comprising:

clamping means for attaching the kickstand to said frame, said clamping means including a first clamping member and a second clamping member positioned circumferentially around a portion of said frame; fastening means extending through the second clamping member into a threaded engagement with said first clamping member to secure said members to said frame; and a stem portion projecting downwardly from said clamping means; and wherein said second clamping member has a circular contour in which said frame is disposed; a notch extends across at least a portion of said counter; and a pin means is disposed in said notch and extends above said circular contour into a wedging engagement with said vehicle so as to prevent relative rotational movement between said coupling means and said frame;

a tubular member having an end portion pivotably carried by the projecting end of said stem portion for movement of said tubular member between said first and second positions, said tubular member having a plurality of axially spaced bores radially extending from the inner to the outer surface of said tubular member;

a support rod telescopically and rotatably engaged within said tubular member with the projecting end of said support rod being adapted to engage the ground to support said vehicle when said tubular member is in said second position;

a detent carried by said support rod and disposed for radial movement therewithin;

means biasing said detent into a latching engagement with one of said tubular member bores when aligned therewith, said detent being movable with said support rod as said support rod is axially adjusted with respect to said tubular member, said tubular member being maintained in a selected axial position with respect to said tubular member by said latching engagement of said detent with one of said tubular member bores, whereby the length of said kickstand may be selectively adjusted to accommodate the distance between the location of said clamping means on said vehicle frame and the ground.

2. The kickstand defined in claim 1 further comprising means normally maintaining said tubular member in said first position.

3. The kickstand defined in claim 1 wherein said stem portion has a radially projecting member and said tubular member has a similar radially projecting member axially spaced below said first mentioned projecting member, a spring having one end fixedly attached to one of said members and the other end fixedly attached to the other of said projecting members, said spring exerting a biasing force on said tubular members to swing said tubular member toward said first position and maintain the same there.

4. The kickstand defined in claim 1 wherein said tubular member is adapted to pivot from said first position beyond the longitudinal axis of said stem portion by a predetermined number of degrees, and means for preventing further rotation beyond said number of degrees, whereby the weight of the vehicle frame tends to bias said tubular member toward said limiting means.

5. The kickstand defined in claim 1 further comprising means for preventing relative rotation between the clamping means and said vehicle frame.

6. The kickstand defined in claim 1 further comprising a plate releasably carried at the end of said support rod and adapted to engage said ground.

7. A kickstand adapted to be releasably attached to the frame of a two wheeled vehicle, said kickstand being of the type adapted to swing selectively into a first position alongside of said vehicle frame and a second position extending downwardly and laterally outwardly from one side of said frame to contact the ground so as to support the vehicle in an upright position, said kickstand comprising:

clamping means for attaching the kickstand to said frame, said clamping means including a first clamping member and a second clamping member positioned circumferentially around a portion of said frame; fastening means extending through the second clamping member into a threaded engagement with said first clamping member to secure said members to said frame; and a stem portion projecting downwardly therefrom; wherein said stem portion has a projecting member secured thereto; and wherein said fastening means comprises at least one Allen bolt extending through said second clamping member into a threaded engagement with said first clamping member, said Allen bolt having a slot adapted to receive an Allen key and said slot being axially spaced from said projecting member at a distance which prevents the entry of a conventional Allen key into said Allen bolt slot;

a tubular member having an end portion pivotably carried by the projecting end of said stem portion for movement of said tubular member between said first and second positions, said tubular member having a plurality of axially spaced bores radially extending from the inner to the outer surface of said tubular member;

a support rod telescopically and rotatably engaged within said tubular member with the projecting end of said support rod being adapted to engage the ground to support said vehicle when said tubular member is in said second position;

a detent carried by said support rod and disposed for radial movement therewithin;

means biasing said detent into a latching engagement with one of said tubular member bores when aligned therewith, said detent being movable with said support rod as said support rod is axially adjusted with respect to said tubular member, said tubular member being maintained in a selected axial position with respect to said tubular member by said latching engagement of said detent with one of said tubular member bores, whereby the length of said kickstand may be selectively adjusted to accommodate the distance between the location of said clamping means on said vehicle frame and the ground.

8. A kickstand adapted to be releasably attached to the frame of a two wheeled vehicle, said kickstand being of the type adapted to swing selectively into a first position alongside of said vehicle frame and a second position extending downwardly and laterally outwardly from one side of said frame to contact the ground so as to support the vehicle in an upright position, said kickstand comprising:

clamping means for attaching the kickstand to said frame, said clamping means including a stem portion projecting laterally and downwardly from said frame;

a tubular member having an end portion pivotably carried by the projecting end of said stem portion for movement of said tubular member between said first and second positions, said tubular member having a plurality of axially spaced bores radially extending from the inner to the outer surface of said tubular member;

a support rod telescopically and rotatably engaged within said tubular member with the projecting end of said support rod being adapted to engage the ground to support said vehicle when said tubular member is in said second position;

a detent carried by said support rod and disposed for radial movement therewithin;

means biasing said detent into a latching engagement with one of said tubular member bores when aligned therewith, said detent being movable with said support rod as said support rod is axially adjusted with respect to said tubular member, said tubular member being maintained in a selected axial position with respect to said tubular member by said latching engagement of said detent with one of said tubular member bores;

wherein said detent mechanism may be radially moved into said support rod from disengagement from one of said bores and said support rod may be angularly rotated with respect to said tubular member such that said detent mechanism is in sliding unlatching engagement with the inner surface of said tubular member, and wherein said support rod has suitable indicia angularly spaced from said detent mechanism so that the user of said kickstand may view said indicia through said bores to determine the position of said detent with respect to the desired bore in which a latching engagement is desired after said rod is longitudinally displaced; and whereby the length of said kickstand may be selectively adjusted to accommodate the distance between the location of said clamping means on said vehicle frame and the ground.

* * * * *